US 6,688,667 B2

(12) United States Patent
Nishimoto et al.

(10) Patent No.: US 6,688,667 B2
(45) Date of Patent: Feb. 10, 2004

(54) POWER SEAT FOR A VEHICLE

(75) Inventors: Shinji Nishimoto, Monroe, MI (US); Takashi Kurashita, Hiroshima (JP)

(73) Assignee: Delta Kogyo Co., Ltd., Aki-gun (JP)

( * ) Notice: Subject to any disclaimer, the term of this patent is extended or adjusted under 35 U.S.C. 154(b) by 0 days.

(21) Appl. No.: 10/349,315

(22) Filed: Jan. 23, 2003

(65) Prior Publication Data

US 2003/0141737 A1 Jul. 31, 2003

(30) Foreign Application Priority Data

Jan. 23, 2002 (JP) ........................................ 2002-014287

(51) Int. Cl.[7] .................................................. B60J 2/02
(52) U.S. Cl. .............................. 296/65.15; 296/65.13; 248/429
(58) Field of Search .......................... 296/65.15, 65.01, 296/65.11, 65.12, 65.13; 248/420, 421, 394, 419, 548, 424, 429, 430; 297/344.1; 411/501

(56) References Cited

U.S. PATENT DOCUMENTS

| | | | | |
|---|---|---|---|---|
| 2,919,744 A | * | 1/1960 | Tanaka | 296/65.15 |
| 2,927,627 A | * | 3/1960 | Lohr | 296/65.15 |
| 4,010,927 A | * | 3/1977 | Pickles | 248/420 |
| 4,015,812 A | * | 4/1977 | Heesch | 248/394 |
| 5,088,841 A | * | 2/1992 | Ikegaya et al. | 297/344.1 |
| 5,224,749 A | * | 7/1993 | Gauger et al. | 296/65.15 |
| 5,275,457 A | * | 1/1994 | Satoh et al. | 296/65.15 |
| 5,292,164 A | * | 3/1994 | Rees | 296/65.15 |
| 5,316,258 A | * | 5/1994 | Gauger et al. | 248/548 |
| 5,393,028 A | * | 2/1995 | Satoh et al. | 248/420 |
| 5,445,354 A | * | 8/1995 | Gauger et al. | 248/429 |
| 5,467,957 A | * | 11/1995 | Gauger | 248/429 |
| 5,507,552 A | * | 4/1996 | Ineich et al. | 248/430 |
| 5,516,071 A | * | 5/1996 | Miyauchi | 248/429 |
| 5,707,035 A | * | 1/1998 | Kargol et al. | 248/429 |
| 5,730,411 A | * | 3/1998 | Pawlowicz et al. | 248/421 |
| 5,738,327 A | * | 4/1998 | Tanaka et al. | 248/419 |
| 5,738,475 A | * | 4/1998 | Chaban | 411/501 |
| 5,746,409 A | * | 5/1998 | Rees | 296/65.13 |
| 5,797,293 A | * | 8/1998 | Chaban | 248/429 |
| 5,823,499 A | * | 10/1998 | Ito et al. | 296/65.15 |
| 5,829,727 A | * | 11/1998 | Chinomi et al. | 248/429 |
| 5,938,164 A | * | 8/1999 | Kargol et al. | 248/429 |
| 6,170,898 B1 | * | 1/2001 | Cunningham et al. | 296/65.13 |
| 6,290,199 B1 | * | 9/2001 | Garrido et al. | 248/424 |
| 6,511,032 B1 | * | 1/2003 | Lee | 296/65.13 |

FOREIGN PATENT DOCUMENTS

| | | |
|---|---|---|
| EP | 1 026 027 A | 8/2000 |
| FR | 2 796 013 A | 1/2001 |
| JP | 9 142181 | * 6/1997 |

* cited by examiner

Primary Examiner—Kiran Patel
(74) Attorney, Agent, or Firm—Smith Patent Office

(57) ABSTRACT

A power seat for a vehicle is provided with an upper channel fixedly attached to a seat, a lower channel fixedly attached to a floor of the vehicle, a nut unit fixedly attached to one of the upper channel and the lower channel, a driver shaft passing through the nut unit, a motor mounted on the other one of the upper channel and the lower channel, a transmission unit for transmitting a torque of the motor to the driver shaft. The nut unit includes a nut block having an internally threaded through hole through which the driver shaft passes, a holder having a front standing wall, a rear standing wall, and a coupling portion coupling the front standing wall and the rear standing wall so as to define a space for holding the nut block, each of the front standing wall and the rear standing wall having buttress walls projecting outward.

6 Claims, 9 Drawing Sheets

POWER SEAT FOR A VEHICLE

BACKGROUND OF THE INVENTION

This invention relates to a power seat for vehicle which is moved forward and backward by a motor.

Generally, a power seat for vehicle includes an upper channel and a lower channel fixedly attached on a floor of a vehicle. A seat is mounted on the upper channel. The upper channel is engaged with the lower channel, and movable along the longitudinal direction of the lower channel. The power seat is provided with a nut unit. The nut unit is secured to the lower channel. A driver shaft is passed through the nut unit, and is rotated in forward and backward directions by an electric motor to slide the upper channel.

The nut unit is usually secured to the lower channel using a holder. A conventional nut unit securing construction is shown in FIG. 8. In this construction, a nut unit 130 is placed in a recessed nut accommodating portion 131a formed by a shock-absorbing member 131, the nut unit 130 in this state is accommodated in a space 132b of a holder 132, and an externally threaded portion 133 provided at the bottom of the holder 132 is inserted through a through hole 134a formed in a lower channel 134 and engaged with a nut 135 from the lower side of the lower channel 134. The driver shaft 136 is passed through an internally threaded hole 130a of the nut unit 130 and through holes 132a of the holder 132 concentrically arranged.

Another conventional securing construction is shown in FIG. 9. In this construction, a shock-absorbing member 141 having an opening 141b at the bottom is put on a nut unit 140 from above, a holder 142 whose middle part projects in U-shape is put on the shock-absorbing member 141, the opposite ends of the holder 142 are placed on a mount position of a lower channel 144, and bolts 145 are engaged with mount holes 142b of the holder 142 from below via mount holes 144a of the lower channel 144 to mount the nut unit 140 on the lower channel 144. An internally threaded hole 140a of the nut unit 140, through holes 141a of the shock-absorbing member 141 and through holes 142a of the holder 142 are concentrically arranged, so that a driver shaft 146 can be passed therethrough.

The movement stroke of the seat is generally restricted by mounting stoppers in the form of nuts, pins or the like on the driver shaft while spacing them apart by a suitable distance. The stopper construction is shown in FIG. 10. In this stopper construction, a transmission unit 147 is used as one stopper and a nut 148 mounted on the driver shaft 146 while being spaced apart from a transmission unit 147 is used as the other stopper. Further, there are provided resin-made washers 150 for preventing the holder 142 from colliding with the transmission unit 147 or the nut 148 to ensure strong engagement between the driver shaft 146 and the internally threaded hole 140a, thereby causing resistance when next movement is started, i.e., for preventing the so-called biting, at the colliding sides of the transmission unit 147 and the nut 148.

In recent years, it has become usual practice to mount side airbags and/or to strengthen a seat frame in order to improve the safety upon crash. This makes the weight of the seat heavier, increasing the load acting on the driver shaft and the nut unit of the power seat.

The holder 132 of the former conventional construction shown in FIG. 8 is formed by drawing, and has thus a thinned portion. Accordingly, there is the demand for such a contrivance as to prevent stresses from being concentrated on the thinned portion as the load increases.

The holder 142 of the latter conventional construction shown in FIG. 9 has a U-shaped middle part bent in a direction normal to moving directions. Thus, there is the demand for such a contrivance as to prevent the U-shaped portion from being elastically deformed.

On the other hand, the stopper construction shown in FIG. 10 has the problem of the increased number of parts since the resin-made washers 150 are separately required in addition to the transmission unit 147 and the nut 148 as the stoppers to prevent the biting.

SUMMARY OF THE INVENTION

It is an object of the present invention to provide a power seat for vehicle which is free from the problems residing in the prior art.

It is another object of the present invention to provide a power seat for vehicle which can prevent the damage of a holder and an occurrence of biting without increasing the number of parts.

According to an aspect of the invention, a power seat for a vehicle is provided with an upper channel fixedly attached to a seat, a lower channel fixedly attached to a floor of the vehicle. The lower channel is slidably engaged with the upper channel. The power seat is further provided with a nut unit fixedly attached to one of the upper channel and the lower channel, a driver shaft passing through the nut unit, a motor mounted on the other one of the upper channel and the lower channel, and a transmission unit for transmitting a torque of the motor to the driver shaft.

The nut unit includes a nut block having an internally threaded through hole through which the driver shaft passes, and a holder for holding a nut block. The holder is formed with a front standing wall, a rear standing wall, and a coupling portion coupling the front standing wall and the rear standing wall so as to define a space for holding the nut block. Each of the front standing wall and the rear standing wall has right and left buttress walls projecting outward, the ends of the right and left buttress walls that face an inner surface of the channel attached with the nut unit coming into contact with the inner surface of the channel attached with the nut unit.

These and other objects, features, and advantages of the present invention will become more apparent upon reading the following detailed description along with the accompanying drawings.

DETAILED DESCRIPTION OF THE PREFERRED EMBODIMENTS OF THE INVENTION

Figure 1:
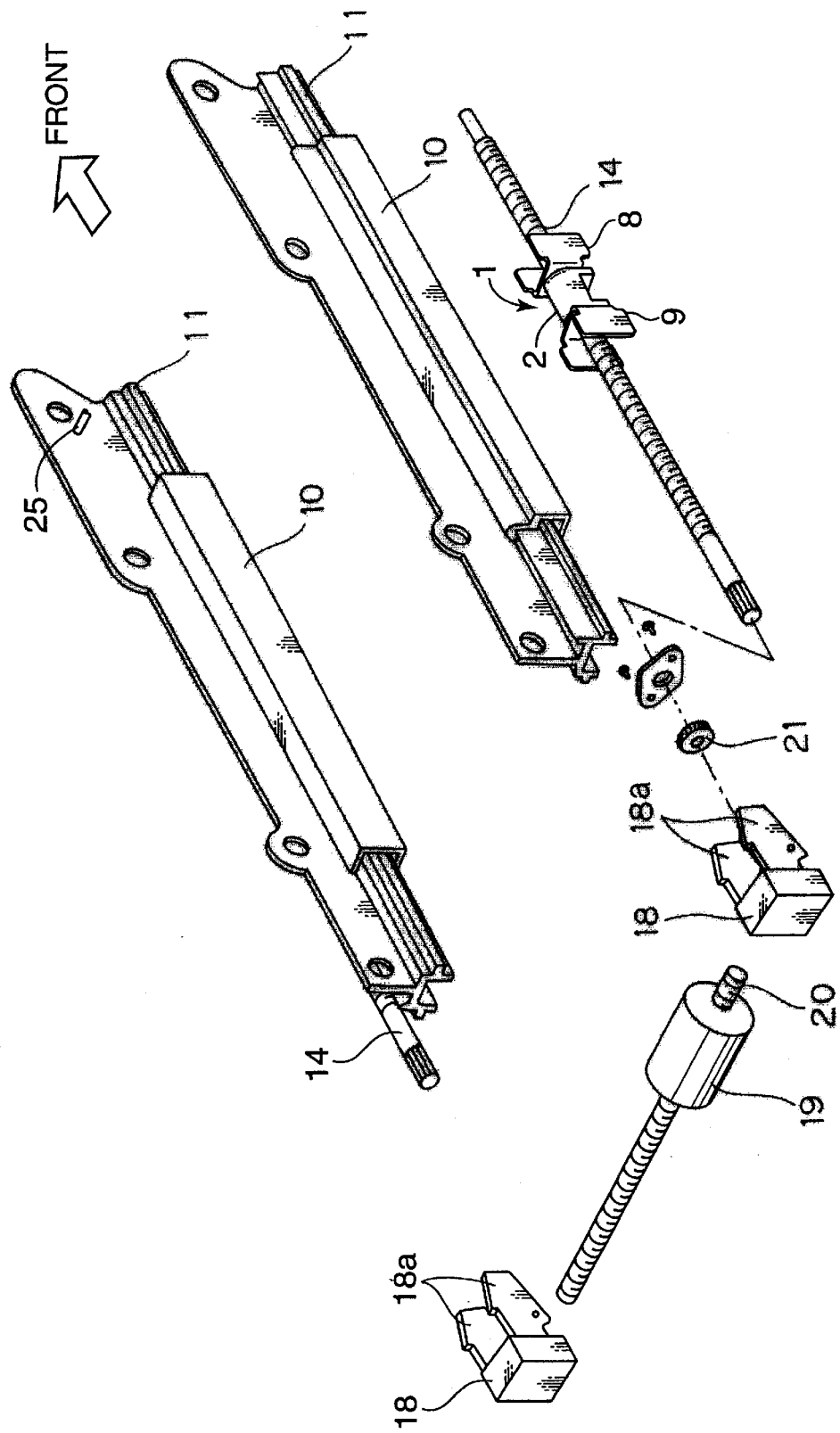
FIG. 1 is an exploded perspective view showing a construction of a power seat for vehicle in accordance with an embodiment of the invention.

A power seat for vehicle embodying the present invention is shown in FIG. 1. An unillustrated seat is mounted on a pair of upper channels 11 which are respectively engaged with and supported on a pair of lower channels 10 fixedly attached to a floor of a vehicle. The upper channel 11 is slidable along the longitudinal direction of the lower channel 10. A driver shaft 14 is passed through a nut unit 1 secured to the lower channel 10 and is rotated in forward and backward directions by an electric motor 19 to slide the upper channel 11 carrying the seat along the longitudinal direction. Identified by 18 in FIG. 1 are a pair of transmission units supported on the upper channel 11 via brackets 18a. The pair of transmission units 18 are operatively connected with the electric motor 19. In each transmission unit 18 is provided a worm mechanism including a worm wheel and worm to transmit a torque of the electric motor 19 to the driver shaft 14. The driver shaft 14 is supported at the nut unit 1 and the transmission unit 18.

Figure 2:
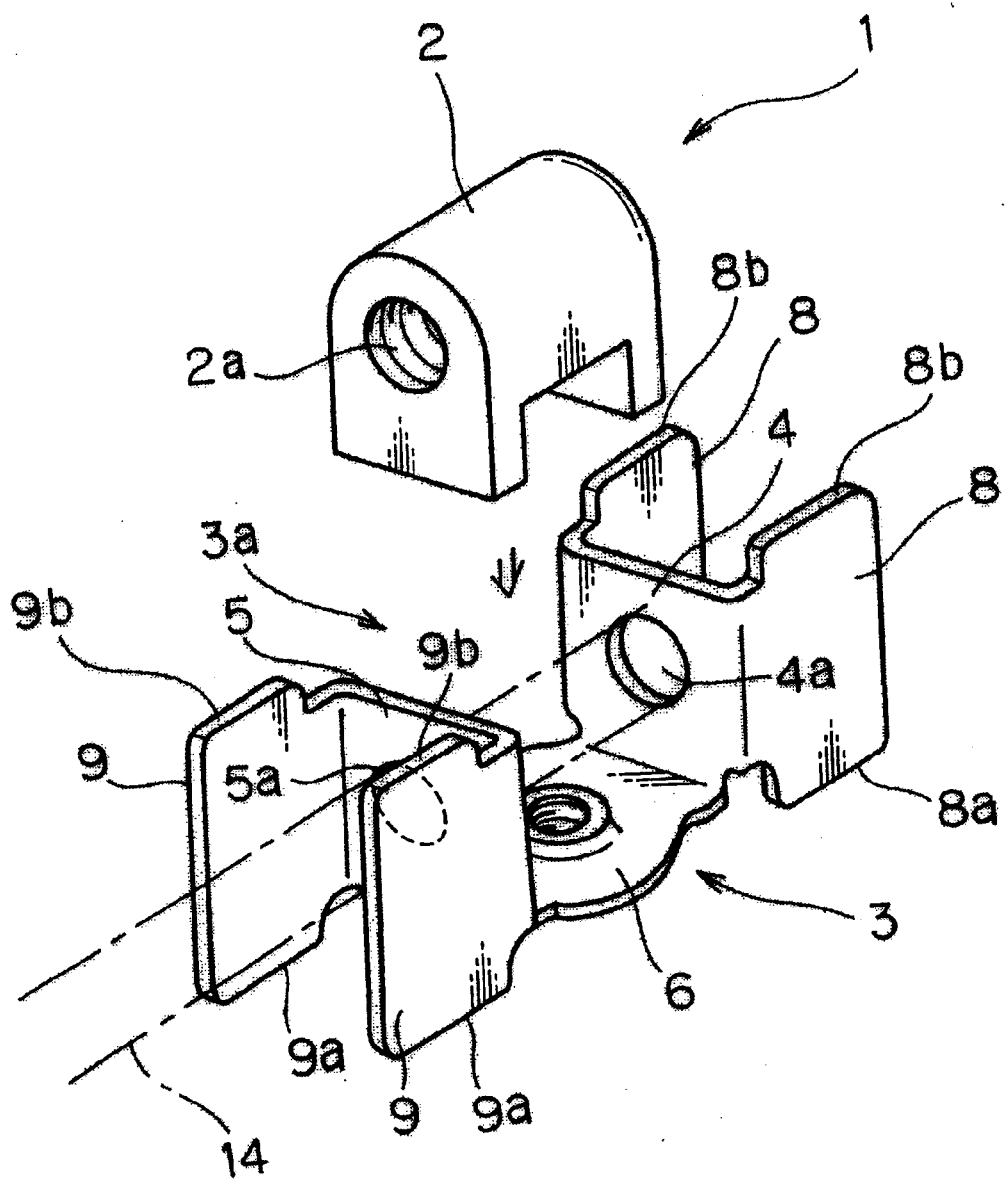
FIG. 2 is a perspective view showing a nut unit used in the power seat.
Figure 3:
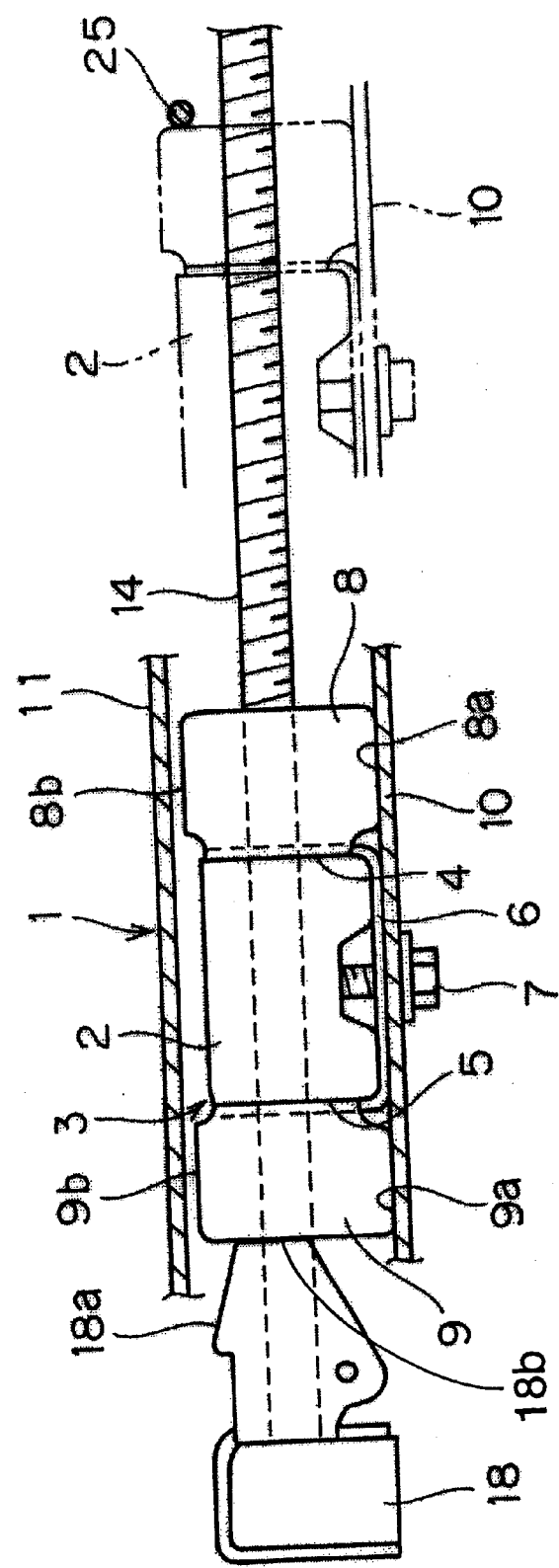
FIG. 3 is a longitudinal sectional view showing the nut unit and stoppers provided before and after the nut unit between a lower channel and an upper channel of the power seat.

Referring to FIG. 2 showing the nut unit 1, the nut unit 1 includes a nut block 2 having an internally threaded hole 2a engageable with the driver shaft 14 and a metallic holder 3 having a space 3a for holding the nut block 2.

The holder 3 includes standing walls 4, 5 forming the front and rear surfaces defining the space 3a and adapted to restrict forward and backward movements of the nut block 2; a coupling portion 6 forming the bottom surface defining the space 3a, coupling the front and rear standing walls 4, 5 and secured to a bolt 7 of the lower channel 10; two buttress walls 8 projecting forward from the opposite left and right ends of the standing wall 4; and two buttress walls 9 projecting backward from the opposite left and right ends of the standing wall 5. As described later, the holder 3 of this embodiment is formed by bending a metallic plate of a specified shape.

The two buttress walls 8 have each a rectangular shape vertically long in a standing direction or vertical direction of the standing wall 4. Likewise, the two buttress walls 9 have each a rectangular shape vertically long in the standing direction of the standing wall 5. Bottom ends 8a of the buttress walls 8 and bottom ends 9a of the buttress walls 9 are held contact with the inner surface of the lower channel 10, whereas upper ends 8b of the buttress walls 8 and upper ends 9b of the buttress walls 9 are held to have a specified clearance against the inner surface of the upper channel 11.

Through holes 4a, 5a having a diameter slightly larger than that of the driver shaft 14 are substantially in the middles of the standing walls 4, 5, respectively. The nut block 2 is held in the space 3a between the standing walls 4, 5, and the driver shaft 14 is so provided as to pass through the through holes 4a, 5a and the internally threaded hole 2a.

Accordingly, when the driver shaft 14 is rotated in the normal direction, the upper channel 11 is moved backward, and may be moved until it comes to a back-limit position where the nut unit 1 hits a spring pin 25 provided on a forward end of the upper channel 11 as a stopper. On the other hand, when the driver shaft 14 is rotated in the reverse direction, the upper channel 11 is moved forward, and may be moved until it comes to a front-limit position where the nut unit 1 hits a stopper 18b integrally formed at the front side of a bracket 18a holding the transmission unit 18. The upper channel 11 is movable between the front-limit position and the back-limit position.

In this embodiment, the holder 3 of the nut unit 1 is made of a metal and has the buttress walls 8, 9 long in the standing direction of the standing walls 4, 5 outside the standing walls 4, 5 coupled via the coupling portion 6. The upper ends 8b, 9b of the buttress walls 8, 9 are made to have the specified clearance against the inner surface of the upper channel 11. The bottom ends 8a, 9a of the buttress walls 8, 9 are made contact with the inner surface of the lower channel 10. Accordingly, the standing wall 5 (4) is prevented from inclining backward (forward) even when the standing wall 5 (4) is pushed backward (forward) by the nut block 2 meshing with the driver shaft 14 because the buttress walls 9 (8) on contact with the inner surface of the lower channel 10 exerts a counter force to the standing wall 5(4). This can prevent the stress from being concentrated on a base portion of the standing walls 4 and 5.

Figure 4:
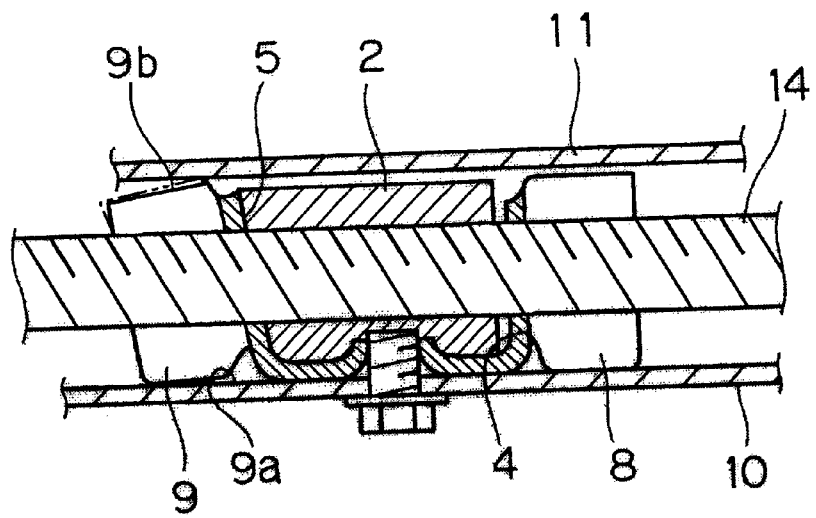
FIG. 4 is a longitudinal sectional view showing an action of the nut unit.

However, if the standing wall 5 (4) should receive an unexpected considerably large load from the driver shaft 14, the standing wall 5 (4) is likely to further incline away from the nut block 2 by the large load as the phantom lines in FIG. 4. Consequently, the rear ends of the bottom ends 9a (8a) of the buttress walls 9 (8) bite into the inner surface of the lower channel 10 and the front ends of the upper ends 9b (9b) of the buttress walls 9 (8) bite into the inner surface of the upper channel 11. Consequently, the buttress walls 9 (8) prevent the upper channel 11 and the seat above the upper channel 11 from moving further.

A predetermined clearance is held between the upper ends 8b (9b) of the buttress walls 8 (9) and the inner surface of the upper channel 11. The predetermined clearance is set so as to allow the standing wall 4 and 5 to be inclinable only by a small angle as well as assure smooth movement of the upper channel 11. However, the predetermined clearance is set at such a gap that the upper ends 8b (9b) of the buttress walls 8 (9) bite into the inner surface of the upper channel 11 when the standing wall 4 (5) receives an excessive large load.

In this embodiment, the buttress walls 9 (8) are long in the standing direction of the standing wall 5 (4) and extend outward from the standing wall 5 (4), i.e., project in the axial direction of the nut unit 1. Accordingly, the buttress walls 9 (8) is considerably strong against deformation in the vertical direction. Therefore, the buttress walls 9 (8) are free from the concentration of stresses thereon.

Further, in this embodiment, the nut block 2 is directly held in the holder 3 without any shock-absorbing member elastically deformable upon coming into contact with the stopper. Thus, there is no occurrence of biting even if the holder 3 strikes against the spring pin 25 or the stopper 18b of the bracket 18a. In addition, it is not necessary to separately provide washers for preventing the occurrence of biting and a shock-absorbing member. Thus, the number of parts can be greatly reduced.

Figure 5:
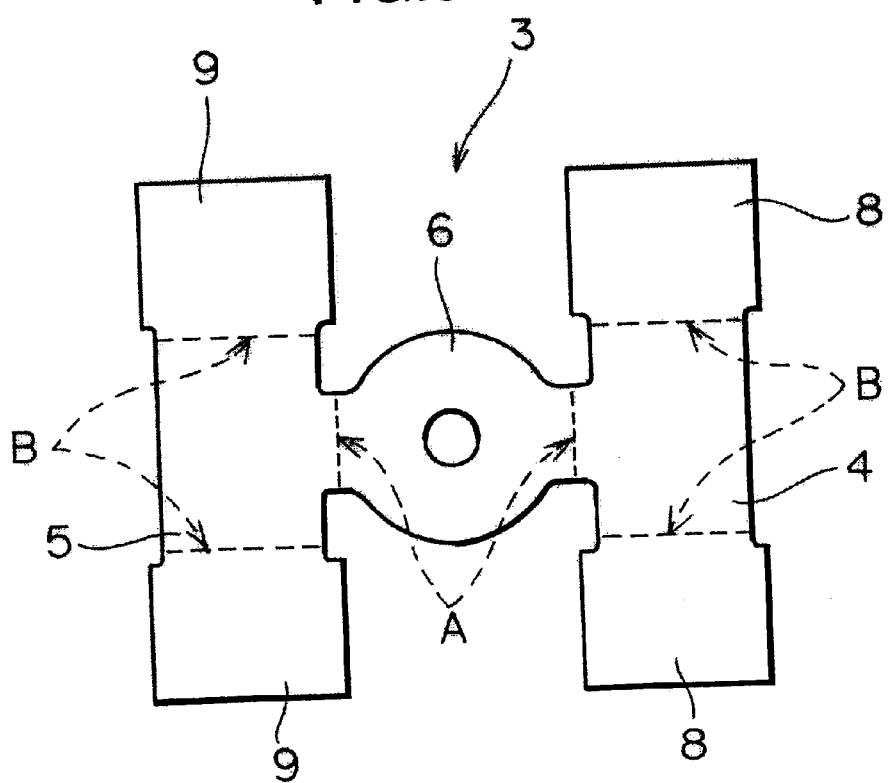
FIG. 5 is a diagram showing a development of a holder provided in the nut unit.

FIG. 5 shows a development of the holder 3. Specifically, the holder 3 is made of a metallic plate having a substantially H-shape into such a shape as shown in FIG. 2 by being bent along lines A to bring the standing walls 4, 5 to the front side of FIG. 5 and bent along lines B to bring the buttress walls 8, 9 to the back side of FIG. 5.

In the case of forming the holder 3 by bending the metallic plate of the specified shape as above, a thick metallic plate capable of securing a desired strength can be used, which is advantageous in terms of strength. The U-shaped portion formed by coupling the two standing walls 4, 5 by the coupling portion 6 has the outward extending buttress walls 8, 9 long in the standing direction of the standing walls 4, 5. As described above, the stress is unlikely to concentrate on the base portions of the standing walls 4, 5 and on the buttress walls 8, 9 themselves. Further, there is no thinned portion resulting from the drawing process.

Further, instead of being formed by bending a metallic plate, the holder 3 may be produced by die casting. Moreover, the holder 3 may be made of a resin.

Further, the bracket 18a holding the transmission unit and the spring pin 25 are used as the stoppers for restricting the movement of the upper channel 11, and the bracket 18a is integrally provided with the stopper 18b. The movement range of the upper channel 11 or the seat can be defined between the spring pin 25 and the bracket 18a only by providing one spring pin 25. Thus, the number of parts can be reduced.

Although the buttress walls 8, 9 are provided at the opposite left and right sides of the standing walls 4, 5 in this embodiment, the present invention is not limited thereto. For example, buttress walls may be provided at either one of the left and right sides of the standing walls or one, three or more buttress walls may be provided at desired position(s).

Figure 6A:
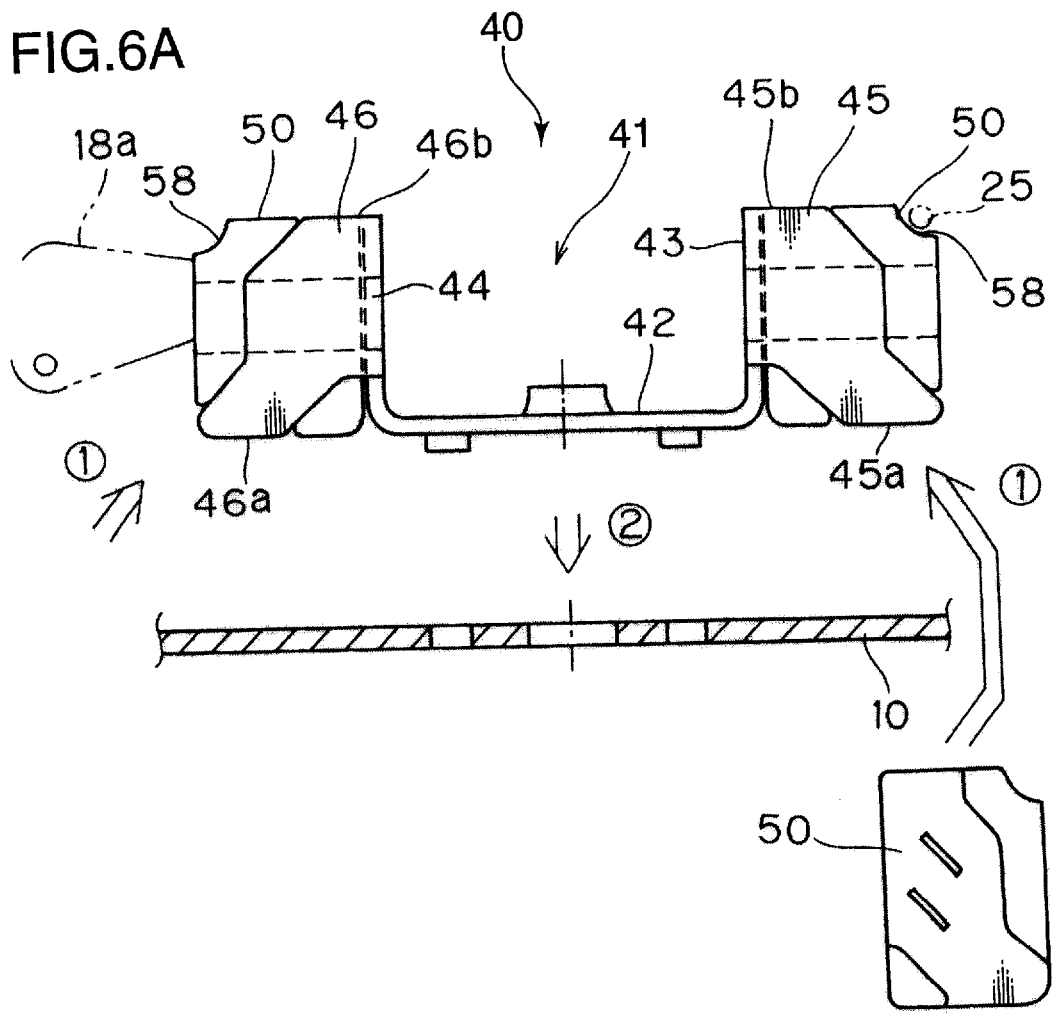
FIG. 6A is an exploded front view showing another nut unit used for the power seat.
Figure 6B:
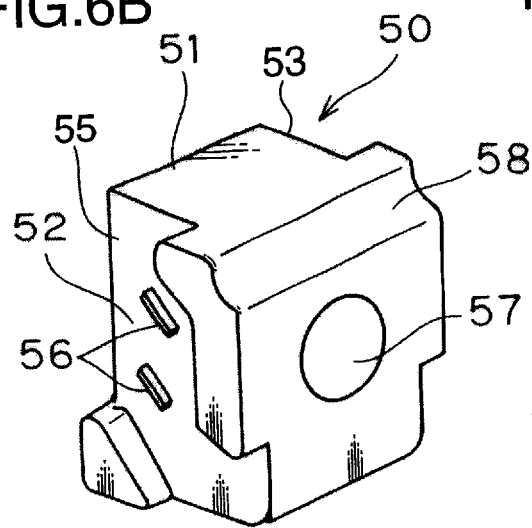
FIG. 6B is a perspective view showing an external configuration of a shock-absorbing member mounted on the nut unit from left-front side.
Figure 6C:
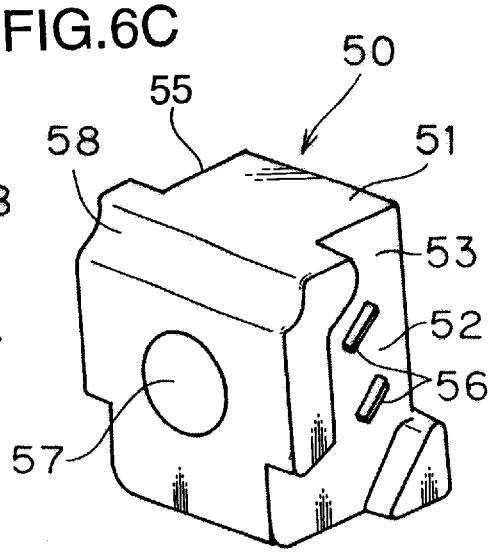
FIG. 6C is a perspective view showing an external configuration of the shock-absorbing member from right-front side.

FIGS. 6A to 6C show another nut unit used in the power seat. A nut unit 40 is designed to reduce a collision sound caused when the nut unit collides with the stopper. Identically shaped shock-absorbing members 50 are mounted at the front and rear sides of the holder 41. In this holder 41, standing walls 43, 44 are provided at the front and rear ends of a coupling portion 42, two buttress walls 45 project forward at the opposite left and right ends of the front standing wall 43, and two buttress walls 46 project backward at the opposite left and right ends of the rear standing wall 44.

The front buttress walls 45 and the rear buttress walls 46 are both so formed as to have an outer slanting edge and an inner slanting edge, and the width of a lower portion 45a (46a) of the buttress walls 45 (46) is made to be smaller than that of an upper portion 45b (46b) of the buttress wall 45 (46).

Each shock-absorbing member 50 is made of a resin, and includes a body portion 51 to be tightly held between the left and right buttress walls 45 or between the left and right buttress walls 46. A left side surface 52 of the body portion 51 is formed with a groove 53 having a shape in conformity with the buttress wall 45, 46, and a right side surface 54 thereof is also formed with a groove 55 having a shape in conformity with the buttress wall 45, 46. Each of the grooves 53, 55 is formed with protuberances 56 for preventing the shock-absorbing member 50 from shaking and for fitting in position when the shock-absorbing member 50 is fitted between the buttress walls 45 (46). Further, a through hole 57 through which a driver shaft is passed is so formed in the middle of the shock-absorbing member 50 as to extend in forward and backward directions, and an indent 58 to come into collision with the spring pin 25 is formed at an upper part of the front surface of the shock-absorbing member 50.

Such shock-absorbing members 50 are mounted by fitting the body portions 51 between the front buttress walls 45 of the holder 41 and between the rear buttress walls 46 thereof as indicated by the arrows ① in FIG. 6A. Subsequently, the coupling portion 42 of the holder 41 is secured to the lower channel 10 as indicated by the arrow ②. Consequently, the shock-absorbing members 50 are prevented from coming out by the lower channel 10, making it easier to mount the holder 41 onto the lower channel 10. Since the resin-made shock-absorbing member 50 first collides with the bracket 18a or the spring pin 25 when the nut unit 40 reaches the back-limit or front-limit, undesirable collision sound is prevented from occurring.

The width of a lower portion of the buttress wall 45 is made to be smaller than that of an upper portion of the buttress wall 45. Accordingly, the shock-absorbing member 50 can be easily mounted on the holder by the way of the insertion end 45a. However, the shock-absorbing member 50 is unlikely to loose out from the holder 41 when the holder 41 is fixedly attached on the lower channel 10 because the shock-absorbing member 50 is kept from going out by the lower channel 10.

Figure 7:
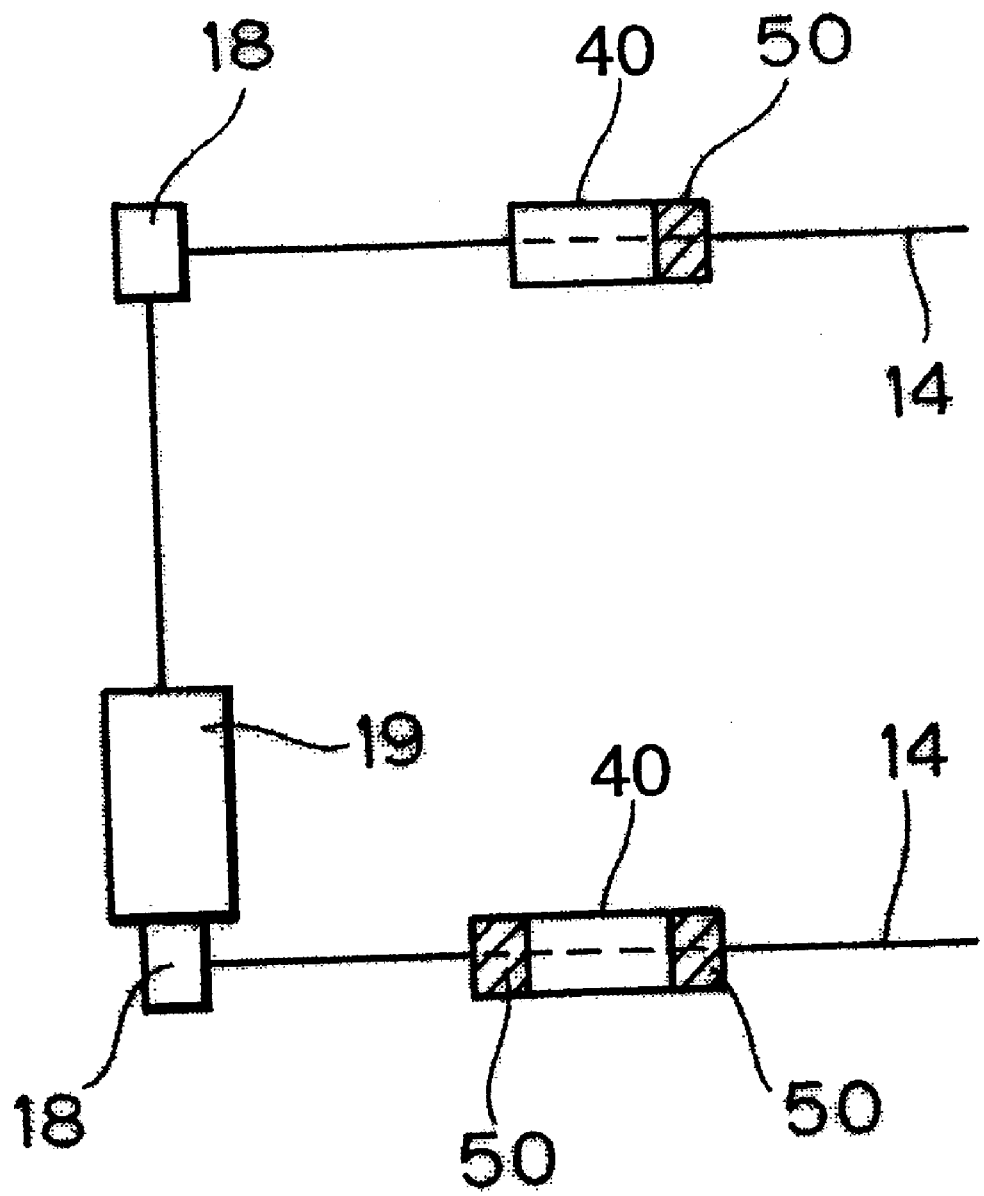
FIG. 7 is a plan view diagrammatically showing an arrangement of driver shafts, motor, transmission unit, and nut units.
Figure 8:
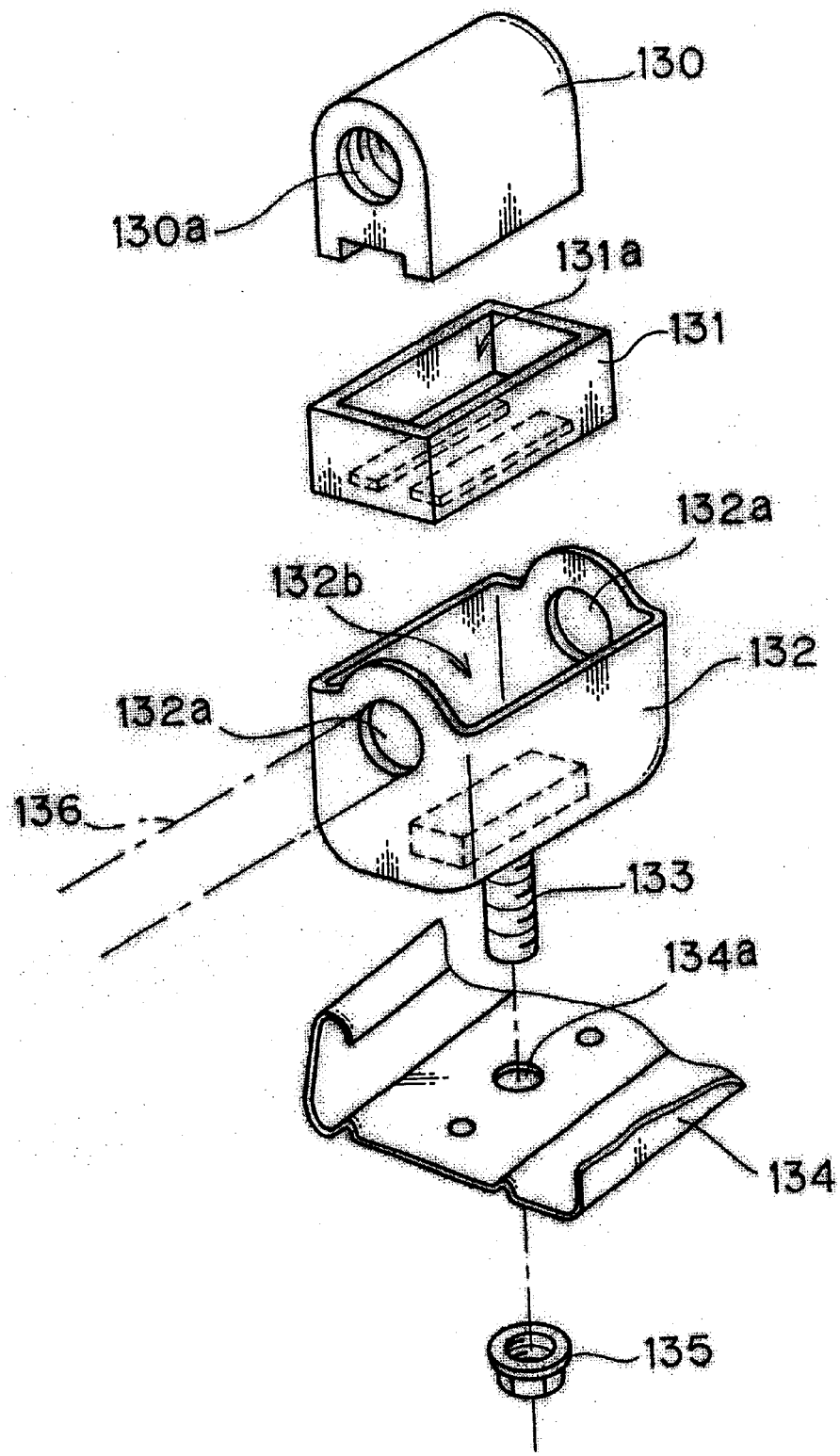
FIG. 8 is an exploded perspective view showing a conventional nut unit.
Figure 9:
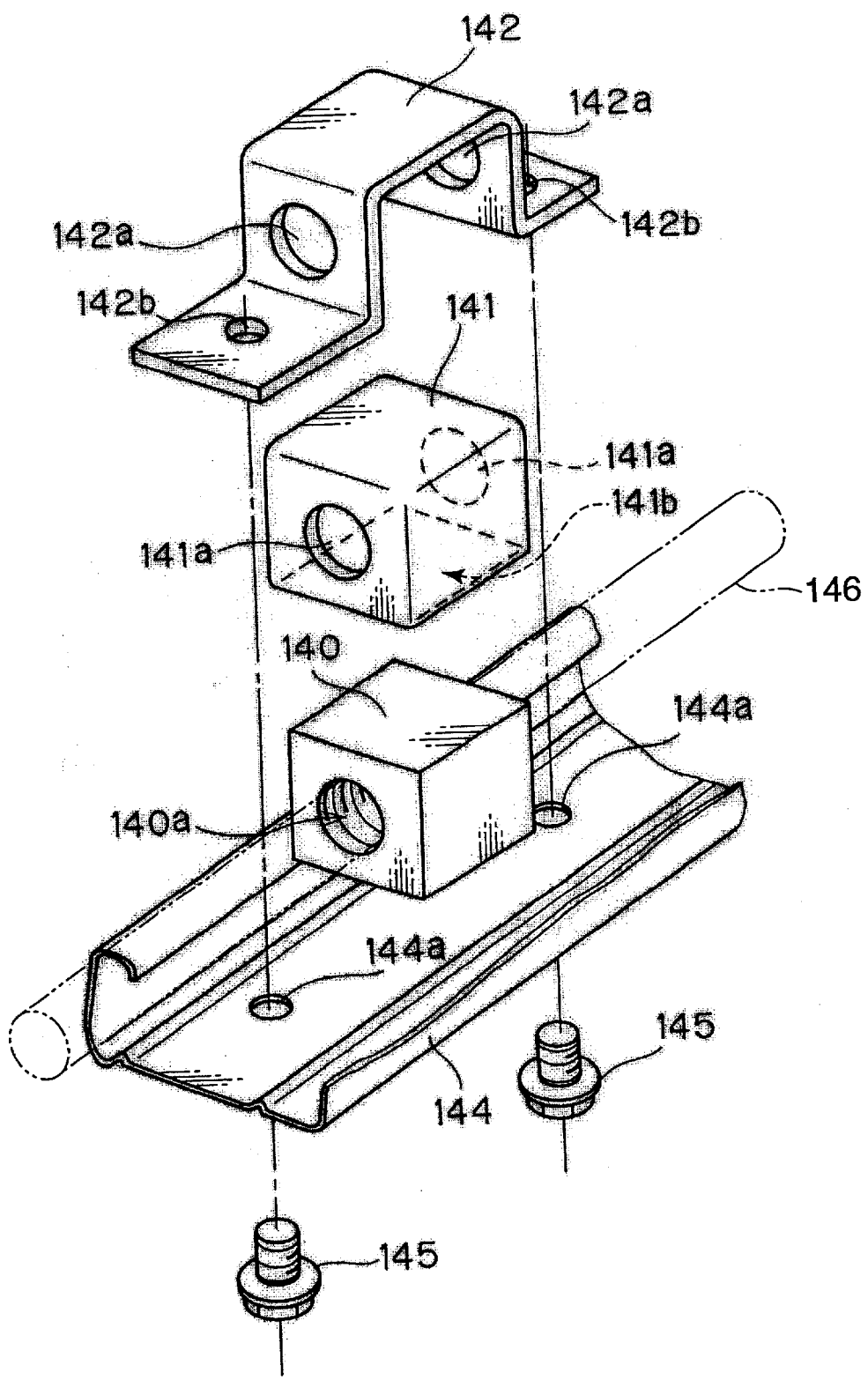
FIG. 9 is an exploded perspective view showing another conventional nut unit.
Figure 10:
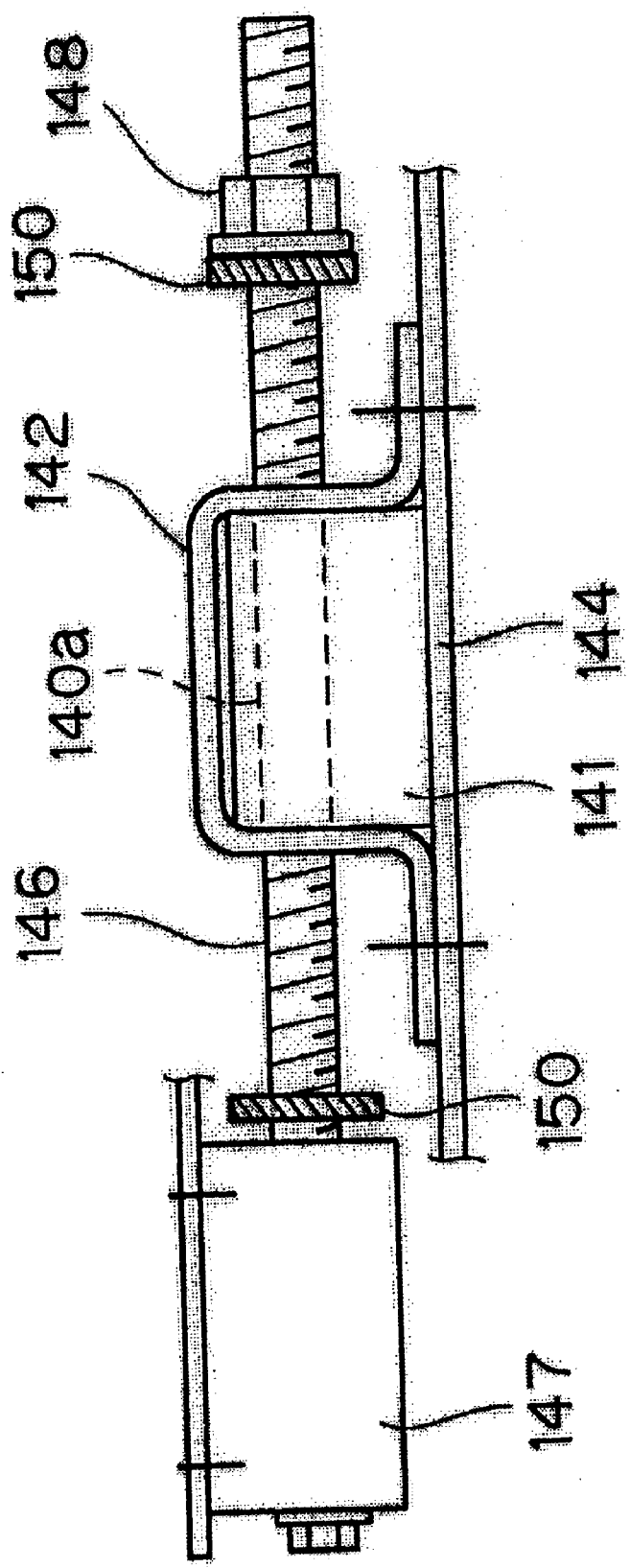
FIG. 10 is a front view showing a combination of the conventional nut unit and the driver shaft.

Referring to FIG. 7 showing an arrangement of the pair of driver shafts 14, the electric motor 19, the pair of transmission units 18, and the pair of nut units 40. In the arrangement of FIG. 7, one of the nut units 40 is provided with two shock-absorbing members 50 in the both sides thereof, while the other nut unit 40 is provided with one shock-absorbing member 50 in the front side. This arrangement of shock-absorbing members 50 is made in the following consideration. The movement strokes of the both driver shafts 14 are the same. For the purpose of reducing collision sounds, it would be sufficient to provide shock-absorbing members at the front and back sides of one of the nut units 40 for the pair of driver shafts 14. In other words, it would not be necessary to provide any shock-absorbing member 50 in the other nut unit 40. However, each driver shaft 14 is supported by the nut unit 40 and the transmission unit 18. Accordingly, it should be understood that the forward end of the driver shaft 14 is not supported by any means, and is likely to rotate eccentrically. The further the driver shafts 40 is moved forward or the upper channels 11 are moved forward, the longer the unsupported forward end portion of the driver shafts 14 becomes. The provision of shock-absorbing member 50 in the forward side of the other nut unit 40 will be effective to prevent the eccentric rotation of the driver member 14.

However, it should be noted that the present invention is not limited to the arrangement shown in FIG. 7. Shock-absorbing members 50 may be provided in the front and back sides of the other nut unit 40. Further, no shock-absorbing member may be provided in the both sides of the other nut units.

In the foregoing embodiment, the driver shaft is rotatably mounted on the upper channels 11 engageable with the lower channels 10 fixedly attached to the floor and the nut unit is provided on the lower channel 10. Conversely, driver shafts may be rotatably mounted on the lower channels 10 fixedly attached to the floor and the nut unit may be provided on the upper channels 11.

As described above, an inventive power seat for a vehicle comprising: an upper channel fixedly attached to a seat; a lower channel fixedly attached to a floor of the vehicle, the lower channel slidably engaged with the upper channel; a nut unit fixedly attached to one of the upper channel and the lower channel; a driver shaft passing through the nut unit; a motor mounted on the other one of the upper channel and the lower channel; a transmission unit for transmitting a torque of the motor to the driver shaft.

The nut unit includes: a nut block having an internally threaded through hole through which the driver shaft passes; a holder having a front standing wall, a rear standing wall, and a coupling portion coupling the front standing wall and the rear standing wall so as to define a space for holding the nut block, each of the front standing wall and the rear standing wall having right and left buttress walls projecting outward. The ends of the buttress walls that face an inner surface of the channel attached with the nut unit come into contact with the inner surface attached with the nut unit. The other ends of the buttress walls that face an inner surface of the other channel not attached with the nut unit is spaced from the inner surface of the other channel by a predetermined clearance. The predetermined clearance is set at such a value that the standing wall further inclines and the other ends of the buttress walls thereby bite into the inner surface of the channel not attached with the nut unit if an unexpected large load is applied to the standing wall.

With this construction, the buttress wall in contact with the inner surface exerts a counter force to keep the standing wall from inclining against a load caused by the driver shaft. This can prevent stresses from being concentrated on the base portions of the standing walls.

Further, when such a large load as to incline the standing wall away from the nut block acts on the nut block, the standing wall is inclined by this load and the upper and bottom ends of the buttress wall are brought into firm contact with the inner surfaces of the respective channels, thereby stopping the upper channel.

The clearance between the ends of the buttress walls and the inner surface of the other channel not attached with the nut unit is set at such a value as not to hinder the normal movement, but such a value that the standing wall further inclines and the other ends of the buttress walls thereby bite into the inner surface of the channel not attached with the nut unit if an unexpected large load is applied to the standing wall. Accordingly, if the nut block and the standing wall receive an expected large load, the ends of the buttress walls bite into the inner surface of the channel not attached with the nut unit to thereby stop the movement of the upper channel promptly, consequently preventing the transmission unit or the motor from being damaged by the unexpected large load.

Further, the buttress walls project outward from the standing walls and are long in the standing direction of the standing walls. Thus, the buttress walls are resistable against the vertical load. Therefore, the buttress walls are free from the concentration of a stress thereon.

Furthermore, the nut block is directly held in the holder without any member and no shock-absorbing member is provided between the holder and the nut block. Thus, there is no occurrence of biting even if the holder strikes against a stopper. In addition, it is not necessary to separately provide washers for preventing an occurrence of biting and the shock-absorbing member is omitted unlike the prior art. Thus, the number of parts can be reduced.

The U-shaped portion may be formed by coupling the two standing walls by the coupling portion. Accordingly, it will be unlikely that stresses concentrate on the base portions of the standing walls and on the buttress walls themselves. Further, there is no thinned portion resulting from the drawing process.

The holder may be made of a metallic material and formed by bending a metallic plate of a specified shape.

Accordingly, a thick plate capable of securing a desired strength can be used, which is advantageous in terms of strength.

The power seat may be preferably further provided with a bracket fixedly attached to the other channel for holding the transmission unit, the bracket serving as a first stopper for providing one restriction limit to a relative movement of the nut unit with respect to the driver shaft; and a pin fixedly attached to the other channel, the pin being spaced apart from the bracket by a specified distance, the pin serving as a second stopper for providing the opposite restriction limit to the relative movement of the nut unit. The movement stroke is defined between the pin and the bracket only by providing the spring pin on the other channel. Also, if the bracket is integrally provided with the stopper, it is sufficient to provide one spring pin and, therefore, the number of parts can be reduced.

The power seat may be further provided with a shock-absorbing member placed in a space defined by the right and left buttress walls and the standing wall. The shock-absorbing members can reduce undesirable sound likely to occur at the time of collision of the nut unit with the stopper.

The buttress wall may be formed with a slanting outer edge and a slanting inner edge so as to make the width of a lower portion of the buttress wall smaller than that of an upper portion of the buttress wall to thereby form a lower outward insertion end. The shock-absorbing member may be formed with a body portion to be tightly held between the corresponding pair of left and right buttress walls, a recess having a shape in conformity with the buttress wall in each of the left and right side of the body portion.

With this construction, the width of a lower portion of the buttress wall is smaller than that of an upper portion of the buttress wall. Accordingly, the shock-absorbing member can be easily mounted on the holder by the way of the insertion end. However, the shock-absorbing member is unlikely to loose out from the holder when the nut unit is fixedly attached on the channel because the shock-absorbing member is kept from going out by the channel.

This application is based on patent application No. 2002-14287 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power seat for a vehicle comprising:
    an upper channel fixedly attached to a seat;
    a lower channel fixedly attached to a floor of the vehicle, the lower channel slidably engaged with the upper channel;
    a nut unit fixedly attached to one of the upper channel and the lower channel;
    a driver shaft passing through the nut unit;
    a motor mounted on the other one of the upper channel and the lower channel;
    a transmission unit for transmitting a torque of the motor to the driver shaft;
    wherein the nut unit includes:
        a nut block having an internally threaded through hole through which the driver shaft passes;

a holder having a front standing wall, a rear standing wall, and a coupling portion coupling the front standing wall and the rear standing wall so as to define a space for holding the nut block, each of the front standing wall and the rear standing wall having right and left buttress walls projecting outward, the ends of the right and left buttress walls that face an inner surface of the channel attached with the nut unit coming into contact with the inner surface of the channel attached with the nut unit.

2. A power seat for a vehicle according to claim 1, wherein the holder is made of a metallic material and formed by bending a metallic plate of a specified shape.

3. A power seat for a vehicle according to claim 2, further comprising:

a bracket fixedly attached to the other channel mounted with the motor for holding the transmission unit, the bracket serving as a first stopper for providing one restriction limit to a relative movement of the nut unit with respect to the driver shaft; and a pin fixedly attached to the other channel mounted with the motor, the pin being spaced apart from the bracket by a specified distance, the pin serving as a second stopper for providing the opposite restriction limit to the relative movement of the nut unit.

4. A power seat for a vehicle according to claim 3, further comprising a shock-absorbing member placed in a space defined by the right and left buttress walls and the standing wall.

5. A power seat for a vehicle according to claim 4, wherein the buttress wall includes:

a slanting outer edge and a slanting inner edge so as to make the width of a lower portion of the buttress wall smaller than that of an upper portion of the buttress wall to thereby form a lower outward insertion end;

the shock-absorbing member includes:

a body portion to be tightly held between the corresponding pair of left and right buttress walls;

a recess having a shape in conformity with the buttress wall in each of the left and right side of the body portion.

6. A power seat for a vehicle according to claim 1, further comprising:

a bracket fixedly attached to the other channel mounted with the motor for holding the transmission unit, the bracket serving as a first stopper for providing one restriction limit to a relative movement of the nut unit with respect to the driver shaft; and a pin fixedly attached to the other channel mounted with the motor, the pin being spaced apart from the bracket by a specified distance, the pin serving as a second stopper for providing the opposite restriction limit to the relative movement of the nut unit.

* * * * *